No. 743,309. Patented November 3, 1903.

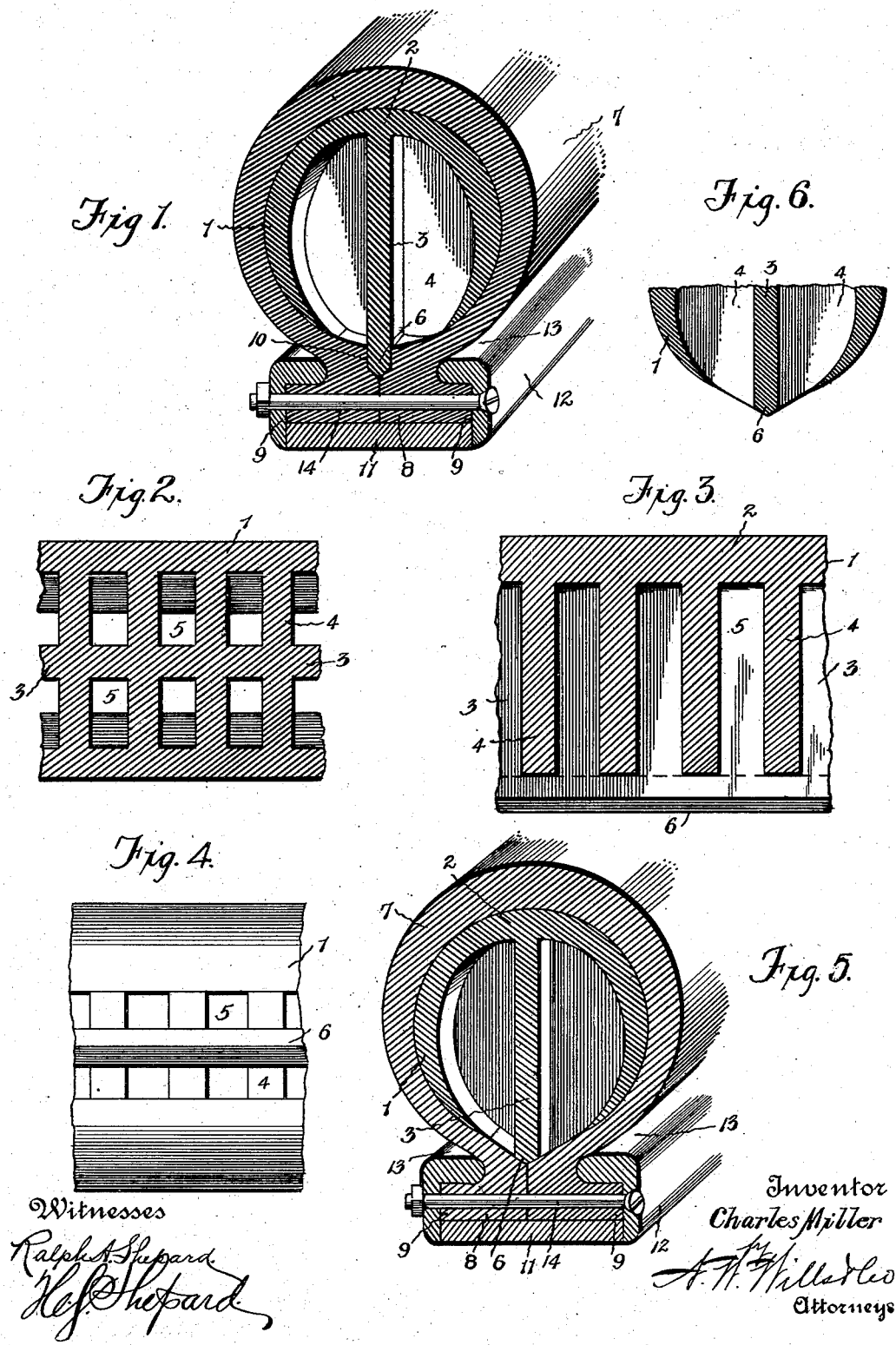

UNITED STATES PATENT OFFICE.

CHARLES MILLER, OF BINGHAMTON, NEW YORK.

RESILIENT CORE AND TIRE.

SPECIFICATION forming part of Letters Patent No. 743,309, dated November 3, 1903.

Application filed February 11, 1903. Serial No. 142,874. (No model.)

*To all whom it may concern:*

Be it known that I, CHARLES MILLER, a citizen of the United States, residing at Binghamton, in the county of Broome and State of New York, have invented new and useful Improvements in Resilient Cores and Tires, of which the following is a specification.

This invention relates to cushion-tires of that character embodying an inner core and an outer shoe or casing, and has for its object to provide for interlocking the core and the casing so as to prevent turning or torsional twisting of the core within the shoe or casing, and it is furthermore designed to provide improvements in the manner of clamping the shoe or casing upon the core and connecting the two members to the rim.

With these and other objects in view the present invention consists in the combination and arrangement of parts, as will be hereinafter more fully described, shown in the accompanying drawings, and particularly pointed out in the appended claims.

In the drawings, Figure 1 is a sectional perspective view of a tire embodying the features of the present invention. Fig. 2 is a detail cross-sectional view of the core. Fig. 3 is a detail longitudinal sectional view of the core. Fig. 4 is a plan view of the inner edge of the core. Fig. 5 is a sectional perspective view of a modified form of the invention, and Fig. 6 is a detail cross-sectional view of a portion of a modified form of core.

Like characters of reference designate corresponding parts in all of the figures of the drawings.

The present tire is of that type which embodies an elastic core and an external shoe or casing which entirely envelops and protects the core and also forms part of the means connecting the tire to a rim.

In the embodiment of the invention as shown in the accompanying drawings the core consists of a substantially cylindrical shell 1, which has a thickened tread portion 2, the opposite sides of which taper or are reduced in thickness and terminate in thin edges which are separated by a longitudinal interspace. Throughout the center of the shell is an integral longitudinal web or partition 3, which divides the center of the whole core into duplicate longitudinal compartments, and these compartments are subdivided by transverse ribs 4, which are integral with the web or partition 3 and the corresponding side portions of the shell of the core. By this construction and arrangement it is rendered cellular and light and at the same time its strength and durability are maintained, and it is prevented from being collapsed when subjected to violent blows. It will here be noted that the cells or compartments 5, formed by the ribs 4, are open at their inner ends, and when the tire is fitted to a rim these open ends are also closed, whereby the compartments form closed airchambers. The longitudinal web or partition 3 is projected at the inner edge of the core, so as to form a longitudinal rib or partition 6, which may have its outer edge pointed or beveled, as clearly indicated in the drawings; but this beveling of the rib may be omitted without impairing the usefulness of the tire in any manner whatsoever.

As the core of the present tire is preferably formed of sponge-rubber, it is necessary to protect the same, and therefore it is snugly enveloped within a shoe or casing 7, preferably formed of some strong and durable composite material—as, for instance, rubber and canvas or other suitable fabric. This shoe or casing has a thickened tread portion and is in the form of a tube which is split longitudinally throughout its inner side, or that side which is opposite the tread portion thereof. The opposite edge portions of the shoe or casing, which are formed by the splitting thereof, are provided with external substantially radial enlargements 8, and each of these enlargements is provided with a lateral outwardly-directed peripheral flange 9. The meeting edges of the split shoe or case are provided with corresponding longitudinal notches or recesses 10, which register and form a seat or socket to snugly receive the longitudinal projection 6 of the core, thereby forming an interlocked connection between the core and shoe or casing, so as to prevent the former from becoming torsionally twisted within the latter.

When applied to a wheel, the enlarged portions 8 of the casing rest flat against the rim or tire 11 and are snugly embraced by means of metallic rings or bands 12, which are provided at their outer edges with inwardly-directed peripheral flanges 13, that overlap and snugly engage the flanges 9 of the casing and are held in intimate engagement therewith by means of a series of fastenings, one of which has been shown at 14 in the form of a bolt which pierces the two bands or rings and the flange portions of the casing and lies between the rim or tire and the flanges 13. By tightening the nut the rings or bands 12 may be drawn to snugly grip the flanged edges of the casing and the opposite sides of rim or tire to the wheel.

A slightly-modified form of the invention has been shown in Fig. 5 of the drawings, which differs from the form hereinbefore described in that instead of terminating the ribs 4 at the opposite edges of the shell portion of the core, as clearly indicated in Fig. 1, said ribs are extended and merged into the projected portion 6 of the longitudinal web or partition 3. In this modified form of the tire the recess for the reception of the projected portion of the central partition 3 in Fig. 1 is not so pronounced, for the reason that the shoe or casing is shaped to receive the tapered and extended portions of the ribs 4; but the effect to prevent torsional twisting of the core is maintained.

Having thus described the invention, what is claimed, and desired to be secured by Letters Patent, is—

1. A tire, embodying a casing which is split longitudinally throughout its inner side, the opposite edges of the split portion being abutted and provided with registered peripheral notches at the inner edge of the split portion, and a core fitted in the casing and having a peripheral projection fitted in the registered notches of the casing.

2. A tire, embodying a casing which is split longitudinally throughout its inner side and has its opposite edges provided with external enlargements, the opposite inner edges of the casing being provided with registered peripheral notches, a core fitted in the casing and provided with a peripheral projection fitted in the seat formed by the registered notches of the casing, and means piercing the enlarged portions of the casing externally of the projection on the core to clamp the latter upon the core.

3. A tire, embodying a hollow casing having an internal peripheral groove or seat, and a core snugly embraced by the casing and consisting of a hollow shell having an internal integral longitudinal web or partition dividing the shell into longitudinal compartments and projected externally of the core and fitted in the seat or groove of the casing.

4. A tire, embodying a casing having an internal peripheral groove or seat, a core consisting of a shell having internal longitudinal and transverse webs or partitions, the longitudinal partition being projected externally of the core and fitted in the seat or groove of the casing.

5. A tire, embodying a casing which is split longitudinally throughout its inner side and has its opposite edges externally enlarged and also provided with registered peripheral notches forming an internal annular seat, a core consisting of a shell having longitudinal and transverse webs or partitions, the longitudinal web or partition being projected externally of the core and fitted in the seat of the casing, and means engaging the enlarged portions of the casing to clamp the latter upon the shoe.

6. In the combination with a rim, a casing split longitudinally throughout its inner side, with its edges provided with external flanges and internal registered notches, a core within the casing and provided with an external longitudinal rib fitted in the seat formed by the registered notches of the casing, angular plates embracing the flanges of the casing and the rim, and fastenings piercing the plates and the flanges of the casing between the rim and the rib of the core.

7. A core for tires, consisting of a substantially tubular shell, having a central longitudinal integral partition which is projected externally at the inner periphery of the core, and transverse webs or partitions subdividing the interior of the core.

In testimony whereof I affix my signature in presence of two witnesses.

CHARLES MILLER.

Witnesses:
ALMON M. SPERRY,
WM. WIRT NEWELL.